US012568935B2

(12) United States Patent
Kim

(10) Patent No.: US 12,568,935 B2
(45) Date of Patent: Mar. 10, 2026

(54) AI-BASED LIVESTOCK MANAGEMENT SYSTEM AND LIVESTOCK MANAGEMENT METHOD THEREOF

(71) Applicant: IT TECH CO., LTD., Anyang-si (KR)

(72) Inventor: Dong Ro Kim, Yesan-gun (KR)

(73) Assignee: IT TECH CO., LTD., Anyang-si (KR)

( * ) Notice: Subject to any disclaimer, the term of this patent is extended or adjusted under 35 U.S.C. 154(b) by 1037 days.

(21) Appl. No.: 17/486,877

(22) Filed: Sep. 27, 2021

(65) Prior Publication Data

US 2022/0022427 A1     Jan. 27, 2022

Related U.S. Application Data

(63) Continuation of application No. PCT/KR2020/015180, filed on Nov. 3, 2020.

(30) Foreign Application Priority Data

Apr. 27, 2020     (KR) ........................ 10-2020-0051068

(51) Int. Cl.
*A01K 29/00* (2006.01)
*G06N 5/02* (2023.01)
*G06T 7/00* (2017.01)

(52) U.S. Cl.
CPC ............. *A01K 29/005* (2013.01); *G06N 5/02* (2013.01); *G06T 7/0012* (2013.01); *G06T 2207/20081* (2013.01)

(58) Field of Classification Search
CPC ...... A01K 29/005; A01K 1/0076; G06N 5/02; G06N 20/00; G06N 20/10; G06T 7/0012;
(Continued)

(56) References Cited

U.S. PATENT DOCUMENTS

2008/0059534 A1* 3/2008 Stroman ............ G06Q 30/0201
2012/0238912 A1 9/2012 Rajkondawar et al.
(Continued)

FOREIGN PATENT DOCUMENTS

JP       2005-511184 A      4/2005
KR       10-1558227 B1     10/2015
(Continued)

OTHER PUBLICATIONS

Bajardi, Paolo, et al. "Optimizing surveillance for livestock disease spreading through animal movements." Journal of the Royal Society Interface 9.76 (2012): pp. 2814-2825 (Year: 2012).*
(Continued)

*Primary Examiner* — Omar F Fernandez Rivas
*Assistant Examiner* — Michael C. Lee
(74) *Attorney, Agent, or Firm* — Studebaker Brackett PLLC

(57)     ABSTRACT

Disclosed is an Artificial Intelligence (AI)-based livestock management system and a livestock management method therefor. According to the inventive concept, it is possible to determine whether the animal has abnormal symptoms by learning the standard livestock stall management data and analyzing the body temperature information and behavior information of livestock from livestock image data obtained in real time from livestock such as cattle, thus giving the manager confidence.

1 Claim, 15 Drawing Sheets

(58) Field of Classification Search

CPC . G06T 2207/20081; G06T 2207/10048; G06T 2207/20084; Y02A 40/70; A61B 5/01; G06Q 50/10; G06Q 50/02; G08B 21/18; G06V 20/52; G16H 50/80

See application file for complete search history.

(56) References Cited

U.S. PATENT DOCUMENTS

| | | | | |
|---|---|---|---|---|
| 2012/0326862 | A1 | 12/2012 | Kwak | |
| 2018/0279582 | A1* | 10/2018 | Yajima | A01K 29/005 |
| 2019/0289826 | A1* | 9/2019 | Tippery | G06N 20/20 |
| 2019/0380306 | A1* | 12/2019 | Niikura | H02S 20/30 |
| 2019/0380311 | A1* | 12/2019 | Crouthamel | A01K 11/004 |
| 2019/0385332 | A1* | 12/2019 | Yajima | G10L 15/26 |
| 2020/0060240 | A1* | 2/2020 | Yajima | A01K 13/00 |

FOREIGN PATENT DOCUMENTS

| | | |
|---|---|---|
| KR | 10-2015-0130803 A | 11/2015 |
| KR | 10-1782042 B1 | 9/2017 |
| KR | 10-2018-0086873 A | 8/2018 |
| KR | 10-2019-0139611 A | 12/2019 |
| WO | 2018/100883 A1 | 6/2018 |
| WO | 2020/003310 A1 | 1/2020 |

OTHER PUBLICATIONS

Bradhurst, Richard A., et al. "Improving the computational efficiency of an agent-based spatiotemporal model of livestock disease spread and control." Environmental Modelling & Software 77 (2016): pp. 1-12 (Year: 2016).*

Rutten, C. J., et al. "Sensor data on cow activity, rumination, and ear temperature improve prediction of the start of calving in dairy cows." Computers and Electronics in Agriculture 132 (2017): pp. 108-118 (Year: 2017).*

Labeur, L., et al. "Infrared thermal imaging as a method to evaluate heat loss in newborn lambs." Research in Veterinary Science 115 (2017): pp. 517-522 (Year: 2017).*

Reith, S., and S. Hoy. "Behavioral signs of estrus and the potential of fully automated systems for detection of estrus in dairy cattle." Animal 12.2 (2018): 398-407 (Year: 2018).*

International Search Report issued in PCT/KR2020/015180; mailed Feb. 3, 2021.

European Search Report issued in EP 20 93 4126; mailed Aug. 9, 2023.

Japan Office Action issued in Japanese Patent Application No. 2022-566127; mailed Sep. 14, 2023.

AI-Based Cattle Abnormality Detection System (AI-CDS), published after Sep. 27, 2021.

Intelligent Livestock Vital Signs Detection System AI CDS, published Apr. 28, 2025.

IT Tech's website (https://www.itechour.com), published after Sep. 27, 2021, accessed Aug. 20, 2025.

* cited by examiner

Spread of disease

AI-BASED LIVESTOCK MANAGEMENT SYSTEM AND LIVESTOCK MANAGEMENT METHOD THEREOF

CROSS-REFERENCE TO RELATED APPLICATIONS

The present application is a continuation of International Patent Application No. PCT/KR2020/015180, filed on Nov. 3, 2020, which is based upon and claims the benefit of priority to Korean Patent Application No. 10-2020-0051068 filed on Apr. 27, 2020. The disclosures of the above-listed applications are hereby incorporated by reference herein in their entirety.

BACKGROUND

Embodiments of the inventive concept described herein relate to an artificial intelligence (AI)-based livestock management system capable of determining whether a livestock has an abnormal symptom by learning standard livestock stall management data and analyzing body temperature information and behavior information from livestock image data obtained in real time from the livestock such as cattle and a livestock management method thereof.

Conventionally, a person figures out the state of each livestock, and allows the livestock to receive medical treatment or isolates the livestock with abnormal symptoms. However, when the number of livestock is large, there is a problem that a large number of manpower is required to manage all the livestock.

In addition, when an infectious disease occurs in some livestock, it may result in the death of most of the livestock, thus resulting in a need for a method for quickly and accurately determining whether the livestock is abnormal.

In addition, in the reality that diseases occurring in a specific area are not limited to a specific place and spread quickly throughout the country due to the development of transportation means, early diagnosis of the disease is required. In determining the disease of the livestock, a temperature measurement method according to the fever is used as a reference for determining the presence or absence of disease.

However, since consistent temperature measurement is performed on many livestock, there is a difficulty in determining diseases according to the state of each livestock. In addition, the method of determining a disease based on temperature measurement has difficulty in detecting an individual at an early stage of disease development.

Moreover, livestock reared in groups within narrow livestock house are very vulnerable to the spread of communicable diseases. Accordingly, as consumption of livestock products increases, various methods for efficiently managing livestock have been proposed.

SUMMARY

Embodiments of the inventive concept provide an Artificial Intelligence (AI)-based livestock management system and a livestock management method thereof.

However, problems to be solved by the inventive concept are may not be limited to the above-described problems. Although not described herein, other problems to be solved by the inventive concept can be clearly understood by those skilled in the art from the following description.

According to an embodiment, an Artificial Intelligence (AI)-based livestock management system includes a manager terminal for a livestock stall, a livestock stall control device that detects at least one of a situation of the livestock stall and an abnormal symptom of a plurality of livestock in the livestock stall through a sensor unit, and acquires livestock image data obtained by photographing the plurality of livestock in the livestock stall through at least one of an imaging camera and a thermal imaging camera, in real time, a management server that receives the livestock image data from the livestock stall control device in real time, separates the plurality of livestock included in the livestock image data into individual objects, extracts object information from the livestock image data, the object information including object body temperature information and object behavior information for the individual objects, generates determination result data obtained by determining at least one abnormal symptom of at least one livestock in the livestock stall by analyzing standard livestock stall management data and the object information based on deep learning technique, transmits the generated determination result data to the manager terminal in real time, and controls the livestock stall control device to change a livestock farming environment of the livestock stall based on the determined at least one abnormal symptom, wherein the standard livestock stall management data includes object basic temperature information generated by repeatedly learning highest body temperature information and lowest body temperature information of a normal object which do not have an abnormal symptom and a surrounding object of the normal object, livestock stall basic temperature information generated by repeatedly learning highest temperature information and lowest temperature information of a normal livestock stall and a surrounding livestock stall of the normal livestock stall, and object basic behavior information generated by analyzing normal behavior of the normal object, the standard livestock stall management data being updated based on the determination result data, wherein the abnormal symptom of the livestock includes a birthing symptom and a mounting symptom, wherein the management server may determine whether the livestock has the abnormal symptom, and classify the abnormal symptom into any one of the birthing symptom and the mounting symptom by using deep learning technique based on the standard livestock stall management data, compare and analyze the object body temperature information and the object basic temperature information included in the standard livestock stall management data, and compare and analyze the object behavior information and the object basic behavior information included in the standard livestock stall management data, predict birthing situation information including an expected birthing time, a required birthing time, and a number of young objects to be born by monitoring behavior information of a mother object determined as having the birthing symptom, generate information on the predicted birthing situation and transmits the information to the manager terminal, when predicting the birthing situation, monitor object body temperature information and object behavior information of the young object in consideration of environment information after birthing of the mother object, the environment information including weather information, season information and time information for surroundings of at least one of the mother object and the livestock stall, when the young object has an abnormal symptom as a result of the monitoring, transmit a first message notifying that the young object has the abnormal symptom to the manager terminal, when it is determined that the mother object delivers the young object in a preset season, a preset weather and a preset time zone based on the environment information, continuously monitor a body temperature of the young object for a preset time of period, when the body temperature of the young object is a hypothermia that is less than or equal to a preset temperature as a result of the monitoring, transmit a second message notifying that the young object is a hypothermia to the manager terminal, when the body temperature of the young object is less than or equal to a preset temperature, indicating that the young object is a hypothermia, as a result of the monitoring, generate a signal for brightening a lighting of the livestock stall to a preset brightness while raising an internal temperature of the livestock stall to a preset temperature, and transmit the signal to the livestock stall control device, predict mounting situation including a number of objects before estrus, an expected time in estrus, a number of expected objects in estrus, and an expected period in non-pregnant condition by monitoring behavior information of an object in estrus determined as having the mounting symptom, generate information on the predicted mounting situation and transmits the information to the manager terminal, generate a signal capable of enabling the object in estrus and a target object expected to be mounted by the object in estrus to be located in a same space by using the information on the mounting situation and transmit the signal to the livestock stall control device when the object in estrus is determined as having the mounting symptom in case of predicting the mounting symptom.

The abnormal symptom of the livestock may include a disease symptom, and the management server may determine that the abnormal symptom of the livestock is the disease symptom based on a result of comparing and analyzing the body temperature information and the object basic temperature information, and the behavior information and the object basic behavior information, and predict a disease spread path by monitoring the body temperature information of a diseased object determined as having the disease symptom. The management server may, in case of predicting the disease spread path, acquire first object temperature information by measuring a body temperature of the diseased object, acquire second object temperature information by measuring a body temperature of a surrounding object of the diseased object, and predict the disease spread path by calculating a first temperature difference between the first object temperature information and the second object temperature information based on the object basic temperature information. The management server may, in case of predicting the disease spread path, acquire first livestock stall temperature information by measuring a temperature of a disease livestock stall in which the diseased object is located, acquire second livestock stall temperature information by measuring a temperature of a surrounding livestock stall of the disease livestock stall, and predict the disease spread path by calculating a second temperature difference between the first livestock stall temperature information and the second livestock stall temperature information based on the livestock stall basic temperature information.

According to an embodiment, a livestock management method for an Artificial Intelligence (AI)-based livestock management system including a manager terminal for a livestock stall, a livestock stall control device, and a management server includes detecting, through a sensor unit of the livestock stall control device, at least one of a situation of the livestock stall and an abnormal symptom of a plurality of livestock in the livestock stall, acquiring, through at least one of an imaging camera and a thermal imaging camera of the livestock stall control device, livestock image data obtained by photographing the plurality of livestock in the livestock stall, in real time, receiving, through the management server, the livestock image data from the livestock stall control device in real time, separating, through the management server, the plurality of livestock included in the livestock image data into individual objects, extracting, through the management server, object information from the livestock image data, the object information including object body temperature information and object behavior information for the individual objects, generating, through the management server, determination result data obtained by determining at least one abnormal symptom of at least one livestock in the livestock stall by analyzing standard livestock stall management data and the object information based on deep learning technique, transmitting, through the management server, the generated determination result data to the manager terminal in real time, and controlling, through the management server, the livestock stall control device to change a livestock farming environment of the livestock stall based on the determined at least one abnormal symptom, wherein the standard livestock stall management data includes object basic temperature information generated by repeatedly learning highest body temperature information and lowest body temperature information of a normal object which do not have an abnormal symptom and a surrounding object of the normal object, livestock stall basic temperature information generated by repeatedly learning highest temperature information and lowest temperature information of a normal livestock stall and a surrounding livestock stall of the normal livestock stall, and object basic behavior information generated by analyzing normal behavior of the normal object, the standard livestock stall management data being updated based on the determination result data, wherein the abnormal symptom of the livestock includes a birthing symptom and a mounting symptom, wherein the management server is configured to determine whether the livestock has the abnormal symptom, and classify the abnormal symptom into any one of the birthing symptom and the mounting symptom by using deep learning technique based on the standard livestock stall management data, compare and analyze the object body temperature information and the object basic temperature information included in the standard livestock stall management data, and compare and analyze the object behavior information and the object basic behavior information included in the standard livestock stall management data, predict birthing situation information including an expected birthing time, a required birthing time, and a number of young objects to be born by monitoring behavior information of a mother object determined as having the birthing symptom, generate information on the predicted birthing situation and transmits the information to the manager terminal, when predicting the birthing situation, to monitor object body temperature information and object behavior information of the young object in consideration of environment information after birthing of the mother object, the environment information including weather information, season information and time information for surroundings of at least one of the mother object and the livestock stall, when the young object has an abnormal symptom as a result of the monitoring, to transmit a first message notifying that the young object has the abnormal symptom to the manager terminal, when it is determined that the mother object delivers the young object in a preset season, a preset weather and a preset time zone based on the environment information, to continuously monitor a body temperature of the young object for a preset time of period, when the body temperature of the young object is a hypothermia that is less than or equal to a preset temperature as a result of the monitoring, to transmit a second message notifying that the young object is a hypothermia to the manager terminal, when the body temperature of the young object is less than or equal to a preset temperature, indicating that the young object is a hypothermia, as a result of the monitoring, to generate a signal for brightening a lighting of the livestock stall to a preset brightness while raising an internal temperature of the livestock stall to a preset temperature, and transmit the signal to the livestock stall control device, predict mounting situation including a number of objects before estrus, an expected time in estrus, a number of expected objects in estrus, and an expected period in non-pregnant condition by monitoring behavior information of an object in estrus determined as having the mounting symptom, generate information on the predicted mounting situation and transmits the information to the manager terminal, generate a signal capable of enabling the object in estrus and a target object expected to be mounted by the object in estrus to be located in a same space by using the information on the mounting situation and transmit the signal to the livestock stall control device when the object in estrus is determined as having the mounting symptom in case of predicting the mounting symptom.

Other details according to an embodiment of the inventive concept are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
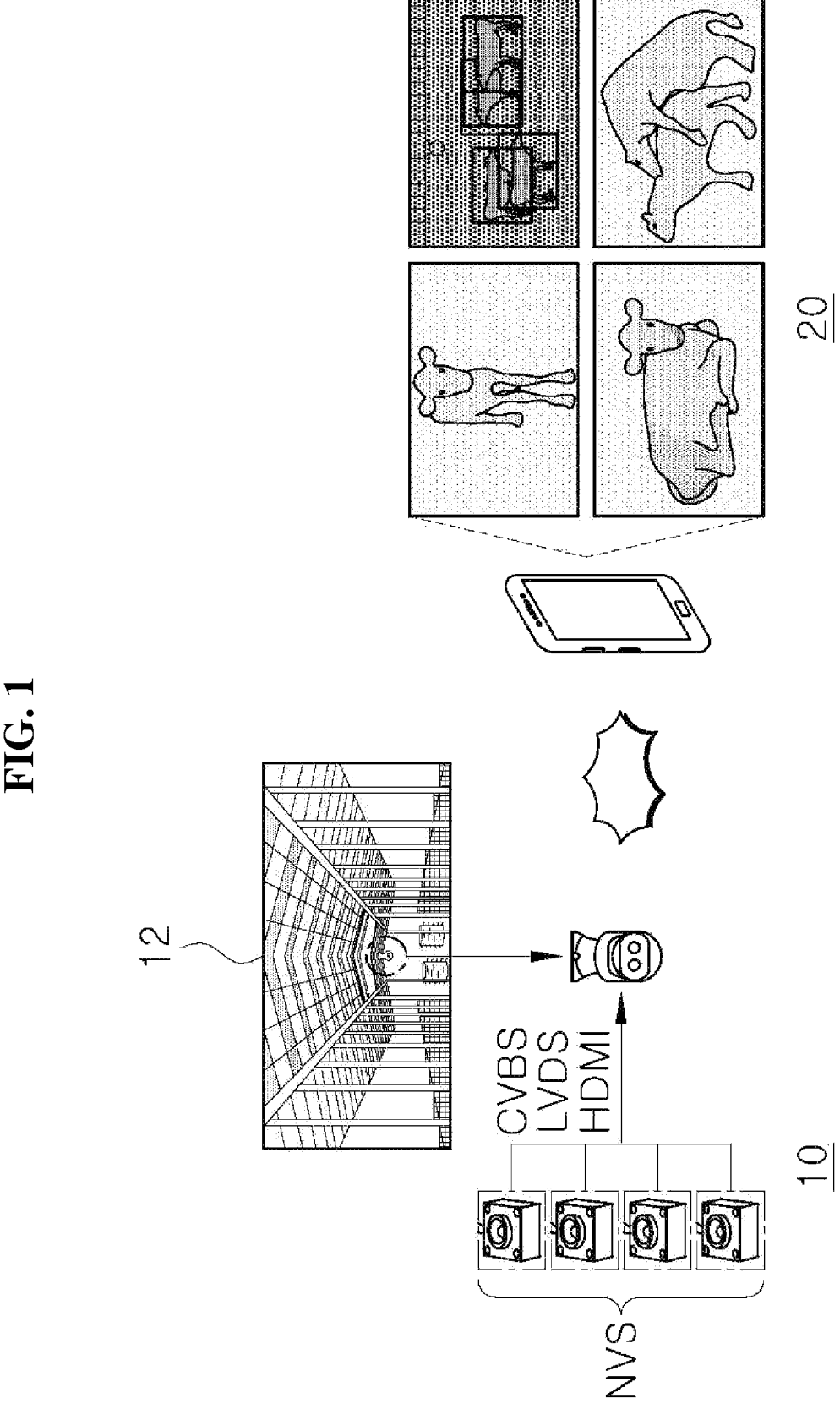
FIG. 1 is a conceptual diagram for describing a smart livestock management system according to an embodiment of the inventive concept.

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/or "comprising" are intended to specify the presence of stated elements, but do not preclude the presence or addition of elements. Like reference numerals refer to like elements throughout the specification, and "and/or" includes each and all combinations of one or more of the mentioned elements. Although "first", "second", and the like are used to describe various components, these components are of course not limited by these terms. These terms are only used to distinguish one component from another. Thus, a first element discussed below could be termed a second element without departing from the teachings of the inventive concept Unless otherwise defined, all terms (including technical and scientific terms) used herein have the same meaning as commonly understood by one of ordinary skill in the art to which this invention belongs. It will be further understood that terms such as those defined in commonly used dictionaries, will not be interpreted in an idealized or overly formal sense unless expressly so defined herein.

Hereinafter, embodiments of the present disclosure will be described with reference to the accompanying drawings.

Figure 2:
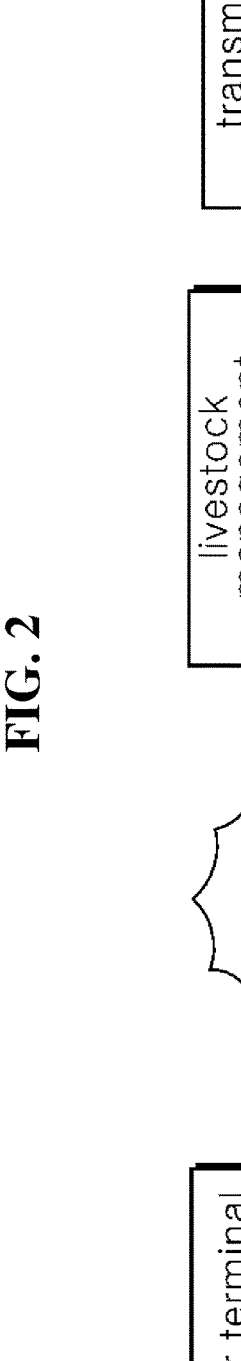
FIG. 2 is a detailed block diagram for describing the smart livestock management system shown in FIG. 1.

FIG. 1 is a conceptual diagram for describing a smart livestock management system according to an embodiment of the inventive concept, and FIG. 2 is a detailed block diagram for describing the smart livestock management system shown in FIG. 1.

Referring to FIGS. 1 and 2, a smart livestock management system 1 according to an embodiment of the inventive concept may include a livestock stall control device 10, a livestock management server 20, and a manager terminal 30. According to an embodiment, the manager terminal 30 may be omitted.

Here, the livestock stall control device 10 and the manager terminal 30 may be synchronized with the livestock management server 20 in real time using a wireless communication network to transmit and receive data. The wireless communication network may support various long-distance communication schemes, various communication schemes, for example, wireless LAN (WLAN), DLNA (Digital Living Network Alliance), WiBro (Wireless Broadband, Wibro), Wimax (World Interoperability for Microwave Access), GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), IEEE 802.16, Long Term Evolution (LTE), Long Term Evolution-Advanced (LTEA), WMBS (Wireless Mobile Broadband Service), BLE (Bluetooth Low Energy), Zigbee, RF (Radio Frequency), LoRa (Long Range), and the like may be applied, but are not limited thereto, and various well-known wireless or mobile communications schemes may be also applied.

In addition, the livestock stall control device 10 and the manager terminal 30 may operate using an application program or application in the present disclosure, and such an application program may be downloaded from an external server or the livestock management server 20 through wireless communication.

The livestock stall control device 10 and the manager terminal 30 may include various portable electronic communication devices that support communication with the livestock management server 20. For example, the livestock stall control device 10 and the manager terminal 30 may be separate smart devices, and may include various terminals, such as a smart phone, a personal digital assistant (PDA), a tablet, a wearable device, (including, for example, a smart watch, a smart glass, an HMD (Head Mounted Display), or the like) and various types of IoT (Internet of Things) terminals but are not limited thereto.

The livestock stall control device 10 may be a device for controlling conditions of a livestock stall 12 in which livestock 11 such as cattle and pigs as well as poultry such as chickens and ducks are reared. Here, the livestock 11 and the livestock stall 12 may be provided in plurality. In this case, an identification tag 110 may be attached to each livestock 11. Accordingly, the livestock 11 may be recognized as an individual object by recognizing each identification tag 110 in livestock image data.

The livestock stall control device 10 may include an image acquisition unit 100, a sensor unit 120, and a livestock stall control unit 140.

The image acquisition unit 100 may obtain image information by photographing the livestock 11 and surrounding environments of the livestock stall 12 by using a plurality of cameras 101 disposed inside and outside the livestock stall 12. Here, the camera 101 may include a photographing device such as a Digital Video Recorder (DVR), a Network Video Recorder (NVR), a Network Video Server (NVS), an Infrared Camera, a Thermo-graphic Camera, or a camera equipped with a Wide Angle Lens or Fish Eye Lens that is effective against water and dust, but is not limited thereto.

In this embodiment, the image acquisition unit 100 may acquire image information containing a general image photographed using a general camera and a thermal image photographed using a thermal imaging camera.

For example, the image acquisition unit 100 may be located inside the livestock stall 12 to photograph the movement of the livestock 11, and may be located outside the livestock stall 12 to photograph an external environment, that is, external intrusion or fire occurrence to acquire image information.

In particular, the image acquisition unit 100 may acquire image information by photographing the inside and outside of the livestock stall 12 using a thermal imaging camera to figure out a disease of the livestock 11 more quickly.

The sensor unit 120 may acquire sensor information by recognizing abnormal symptoms of the livestock 11 located in the livestock stall 12. Here, the sensor unit 120 may include a temperature sensor 122, a motion sensor 124, a sound sensor 126, a smell sensor 128 and the like, but is not limited thereto.

For example, the sensor unit 120 may detect a temperature inside and outside the livestock stall 12 using the temperature sensor 122. For example, a body temperature of the livestock 11 located inside the livestock stall 12, an interior temperature of the livestock stall 12, and an exterior temperature of the livestock stall 12 may be detected.

In addition, the sensor unit 120 may detect a movement inside and outside the livestock stall 12 using the motion sensor 124. For example, the movement of the livestock 11 located inside the livestock stall 12 or the movement of a manager or a visitor outside the livestock stall 12 may be detected.

In addition, the sensor unit 120 may detect sound inside and outside the livestock stall 12 using the sound sensor 126. For example, it is possible to detect cries of the livestock 11 located inside the livestock stall 12 and noise inside and outside the livestock stall 12.

In addition, the sensor unit 120 may detect smell inside and outside the livestock stall 12 using the smell sensor 128. For example, it is possible to detect smell inside and outside the livestock stall 12, such as the smell of excrement of the livestock 11 located inside the livestock stall 12 and the smell generated when fire occurs in the livestock stall 12.

Accordingly, by using sensor information acquired through the sensor unit 120, it is possible to more accurately determine whether an abnormality of the livestock 11 is a disease symptom, a birthing symptom, and a mounting symptom.

The livestock stall control unit 140 may generate livestock image data from image information obtained from the image acquisition unit 100.

For example, the livestock stall control unit 140 may generate livestock image data by converting image information acquired by receiving image information, obtained through the image acquisition unit 100, through a USB terminal, a CVBS (Composite Video Banking Sync) terminal, a component terminal, an S-video terminal (analog), a DVI (Digital Visual Interface) terminal, an HDMI (High Definition Multimedia Interface) terminal, an RGB terminal, a D-SUB terminal, or the like.

For example, the livestock stall control unit 140 may generate the livestock image data by matching a general image photographed using a general camera with a thermal image photographed using a thermal imaging camera.

According to an embodiment, the livestock stall control unit 140 may generate the livestock image data by converting the image information acquired from the image acquisition unit 100 and the sensor information acquired from the sensor unit 120.

For example, the livestock stall control unit 140 may convert big data including the image information obtained from the image acquisition unit 100 and the sensor information obtained from the sensor unit 120 to be transmitted/received smoothly to generate livestock image data.

According to an embodiment, the livestock stall control unit 140 may generate livestock image data in consideration of current situation information including real-time weather information, season information, and time information of the livestock 11 and the livestock stall 12 in which the livestock 11 is located.

According to an embodiment, the livestock stall control unit 140 may generate livestock image data in consideration of current situation information including real-time weather information, season information, and time information of the livestock 11 and the livestock stall 12 in which the livestock 11 is located, image information, and sensor information.

The livestock stall control unit 140 may transmit the livestock image data to the livestock management server 20 and/or the manager terminal 30 in real time.

According to an embodiment, the livestock stall control unit 140 may transmit the image information to the livestock management server 20 and/or the manager terminal 30.

According to an embodiment, the livestock stall control unit 140 may transmit the image information and the sensor information to the livestock management server 20 and/or the manager terminal 30.

According to an embodiment, the livestock stall control unit 140 may receive a feedback signal generated in response to determination result data, and control the livestock stall control device 10 in real time for a photographing direction of the camera unit 101, a sound level or turning-on/off of a warning sound, and an luminous intensity or turning-on/off of a lighting, turning-on/off of a door of the livestock stall 12, turning-on/off of fire facility, or the like.

The livestock management server 20 may include a data transmission/reception unit 200, a data collection unit 210, a data storage unit 220, a data analysis unit 230, a monitoring unit 240, and a management control unit 250.

The data transmission/reception unit 200 may receive livestock image data from the livestock stall control device 10, and transmit a feedback signal to the livestock stall control device 10.

According to an embodiment, the data transmission/reception unit 200 may transmit livestock image data and standard livestock stall management data to the manager terminal 30, and receive the determination result data and the feedback signal corresponding to the determination result data from the manager terminal 30.

The data collection unit 210 may collect data included in the livestock image data.

Specifically, the data collection unit 210 may extract highest body temperature information and lowest body temperature information of a normal livestock that do not have an abnormal symptom and a surrounding livestock of the normal livestock, from the livestock image data.

In addition, the data collection unit 210 may recognize the identification tag 110 attached to the livestock 11 from the livestock image data, and extract highest temperature information and lowest temperature information of a normal livestock stall where the normal object is located, and a surrounding livestock stall of the normal livestock stall.

In addition, the data collection unit 210 may extract object information including object body temperature information and object behavior information of a diseased object and a surrounding object of the diseased object from the livestock image data.

Also, the data collection unit 210 may extract environment information including temperature information of a disease livestock stall where a diseased object is located and a surrounding livestock stall of the disease livestock stall from the livestock image data. According to an embodiment, the environment information may include weather information, season information, and time information of a place where an object and a livestock stall in which the object is located are located.

In addition, the data collection unit 210 may extract object information including object body temperature information and object behavior information of a pregnant object from the livestock image data.

In addition, the data collection unit 210 may extract object information including object body temperature information and object behavior information of a surrounding object after birthing of the pregnant object from the livestock image data.

In addition, the data collection unit 210 may extract environment information including temperature information of a surrounding livestock stall after the birthing of the pregnant object from the livestock image data.

In addition, the data collection unit 210 may extract object information including object body temperature information and object behavior information of a mounting object and a surrounding object of the mounting object from the livestock image data.

Further, the data collection unit 210 may extract environment information including temperature information of a mounting livestock stall where a mounting object is located and a surrounding livestock stall of the mounting livestock stall from the livestock image data.

The data storage unit 220 may store data transmitted and received between the livestock stall control device 10 and the livestock management server 20 and between the livestock management server 20 and the manager terminal 30 and data supporting various functions of the livestock management server 20. The data storage unit 220 may store a plurality of application programs (or applications) driven in the livestock management server 20, and data and commands for the operation of the livestock management server 20. At least some of these application programs may be downloaded from an external server through wireless communication.

The data analysis unit 230 may separate a plurality of livestock 11 included in the data collected through the data collection unit 210 into individual objects based on the livestock image data, and analyze object information based on the standard livestock stall management data. In this case, the data analysis unit 230 may separate the plurality of livestock 11 included in the livestock image data into the individual objects using the identification tag 110, but is not limited thereto.

The monitoring unit 240 may monitor data transmitted and received between the livestock stall control device 10 and the livestock management server 20 and between the livestock management server 20 and the manager terminal 30 through a screen.

According to an embodiment, by monitoring transmission and reception of data between the livestock stall control device 10 and the livestock management server 20 in real time, it is possible to give more confidence the manager terminal 30 in managing the livestock 11 by rapidly dealing with a communication error or an abnormal symptom when the communication error or the abnormal symptom in the livestock stall control device 10 occurs.

The management control unit 250 may generate standard livestock stall management data by repeatedly learning the data collected through the data collection unit 210. Here, the standard livestock stall management data may be updated in real time in response to the determination result data.

In this embodiment, the management control unit 250 may generate the standard livestock stall management data using a deep learning technique, but is not limited thereto, and machine learning techniques such as a random forest or a support vector machine may be used.

Here, the standard livestock stall management data may include object basic temperature generated by repeatedly learning the highest body temperature information and lowest body temperature information of a normal livestock and a surrounding livestock of the normal livestock and livestock stall basic temperature information generated by repeating learning the highest temperature information and the lowest temperature information of a normal livestock stall and a surrounding livestock stall of the normal livestock stall.

The management control unit 250 may determine whether the livestock 11 has an abnormal symptom by using a result of analysis of the livestock image data based on the standard livestock stall management data and generate determination result data. That is, the management control unit 250 may match the standard livestock stall management data with the livestock image data to determine whether there is an abnormal symptom, and generate the determination result data including a result of the determination. Here, the livestock image data may be data obtained by converting image information acquired through the camera 101, but may not be limited thereto.

Alternatively, image information acquired through the camera 101 and sensor information acquired from the sensor unit 120 may be converted data.

According to an embodiment, the management control unit 250 may determine whether the livestock 11 has an abnormal symptom, and classify the symptom into a disease symptom, a birthing symptom, or a mounting symptom to generate the determination result data.

For example, the management control unit 250 may determine the abnormal symptom as a disease symptom and generate the determination result data by comparing and analyzing the object body temperature information of the object information included in the livestock image data and the object basic temperature information included in the standard livestock stall management data.

Accordingly, the management control unit 250 may predict a disease spread path by monitoring the object body temperature information of a diseased object based on the determination result data of the disease symptom.

Specifically, the management control unit 250 may measure the body temperature of the diseased object and the body temperature of the surrounding object of the diseased object, and then calculate a difference in the object body temperature between the diseased object and the surrounding object of the diseased object to predict the disease spread path.

The management control unit 250 may measure the temperature of a disease livestock stall where the diseased object is located and the temperature of a surrounding livestock stall of the disease livestock stall where the diseased object is located, and calculate a difference in temperature between the disease livestock stall and the surrounding livestock stall of the disease livestock stall to determine the disease spread path.

According to an embodiment, the management control unit 250 may predict the disease spread path in consideration of the calculated difference in object body temperature and the difference in livestock stall temperature.

According to an embodiment, the management control unit 250 may determine the abnormal symptom as a disease symptom and generate the determination result data by comparing and analyzing the object body temperature information of the object information included in the livestock image data and the object basic temperature information included in the standard livestock stall management data and comparing and analyzing the object behavior information of the object information included in the livestock image data and the object basic behavior information included in the standard livestock stall management data.

In other words, when the body temperature of the object is higher or lower than the object basic body temperature information, or the object behaves such as lying down for a long time, turning around, constantly crying, or not moving at all, unlike the object basic behavior information, the management control unit 250 may make a determination as a disease symptom such as respiratory disease, fever, or stomach disease to generate the determination result data. When the determination result data indicates a disease symptom, the management control unit 250 may predict a disease spread path by using livestock stalls centering on the diseased object, surrounding objects of the diseased object, and object information and environment information of the surrounding objects.

According to the embodiment, the management control unit 250 may determine the abnormal symptom as a disease symptom and generate the determination result data by comparing and analyzing the object behavior information of the object information included in the livestock image data and the object basic behavior information included in the standard livestock stall management data.

According to an embodiment, the management control unit 250 may update the disease spread path in real time and transmit the disease spread path to the manager terminal 30 in real time.

In addition, the management control unit 250 may determine the abnormal symptom as a birthing symptom and generate the determination result data by comparing and analyzing the object body temperature information of the object information included in the livestock image data and the object basic temperature information included in the standard livestock stall management data and comparing and analyzing the object behavior information of the object information included in the livestock image data and the object basic behavior information included in the standard livestock stall management data.

In other words, when the object's body temperature is lower than the object's basic temperature information or the object's behavioral pattern is similar to a birthing pattern, that is, when livestock constantly raises its tail, sheds its hind paws at shorter intervals, or repeatedly engages in restless sitting and getting up, the management control unit 250 may make a determination as a birthing symptom to generate the determination result data. When the determination result data indicates a birthing symptom, the management control unit 250 may predict birthing situation information including an expected birthing time, a required birthing time, the gender of a calf, the number of objects born, and the like.

According to an embodiment, the management control unit 250 may update the birthing situation information in real time and transmit the birthing situation information to the manager terminal 30 in real time.

According to the embodiment, the management control unit 250 may determine the abnormal symptom as a birthing symptom and generate the determination result data by performing comparison and analysis based on object basic temperature information included in the standard livestock stall management data.

According to the embodiment, the management control unit 250 may determine the abnormal symptom as a birthing symptom and generate the determination result data by comparing and analyzing the object behavior information of the object information included in the livestock image data and the object basic behavior information included in the standard livestock stall management data.

According to an embodiment, the management control unit 250 may monitor object information for a young object (e.g., calf) in consideration of environment information after birthing of a pregnant object, and when an abnormal symptom occurs, transmit a notification message to the manager terminal 30.

For example, when the pregnant object delivers a young object in the late autumn night on a rainy day, the management control unit 250 may continuously monitor the young object and when a low body temperature is detected, promptly transmit a notification message to the manager terminal 30.

In addition, the management control unit 250 may determine the abnormal symptom as a mounting symptom and generate the determination result data by comparing and analyzing the object body temperature information of the object information included in the livestock image data and the object basic temperature information included in the standard livestock stall management data and comparing and analyzing the object behavior information of the object information included in the livestock image data and the object basic behavior information included in the standard livestock stall management data.

In other words, when the object's body temperature is higher than the object basic temperature information, or the behavioral pattern of the object is similar to a mounting pattern, that is, when an object licks another object, permits mounting of another object/mounts another object, cries continuously, puts its head on another object's buttocks, or performs a movement 3-4 times more than normal movement, the management control unit 250 may make a determination as a mounting symptom to generate determination result data. When the determination result data indicates the mounting symptom, the management control unit 250 may predict mounting situation information including the number of objects before estrus, an expected time in estrus, the number of expected objects in estrus, and an expected period in non-pregnant condition.

In the present embodiment, the management control unit 250 may determine the abnormal symptom as a mounting symptom by comparing and analyzing the behavior pattern of the object using a deep learning technique based on the standard livestock stall management data.

According to an embodiment, the management control unit 250 may update the mounting situation information in real time and transmit the mounting situation information to the manager terminal 30 in real time.

According to the embodiment, the management control unit 250 may determine the abnormal symptom as the mounting symptom and generate the determination result data by performing comparison and analysis based on object basic temperature information included in the standard livestock stall management data.

According to the embodiment, the management control unit 250 may determine the abnormal symptom as the mounting symptom and generate the determination result data by comparing and analyzing the object behavior information of the object information included in the livestock image data and the object basic behavior information included in the standard livestock stall management data.

According to an embodiment, the management control unit 250 may receive current situation information including real-time weather information, season information, and time information of the livestock 11 and the livestock stall 12 in which the livestock 11 is located, in real time through an external organization and match and analyze the standard livestock stall management data and the livestock image data to generate the determination result data.

According to an embodiment, the management control unit 250 may generate a feedback signal corresponding to the determination result data and transmit the feedback signal to the livestock stall control device 10 to control the livestock stall control device 10.

For example, in the case of making a determination as a disease symptom according to the determination result data, the management control unit 250 may generate a feedback signal capable of separating a diseased object and a normal object by using a predicted disease spread path of the diseased object.

In addition, in the case of making a determination as a birthing symptom according to the determination result data, the management control unit 250 may generate a feedback signal capable of separating and moving a mother object and a young object to a separate stall 11 by using the predicted birthing situation information.

In addition, in the case of making a determination as a mounting symptom according to the determination result data, the management control unit 250 may generate a feedback signal capable of enabling an object in estrus and a target object expected to be mounted by the object in estrus to be located in the same space (e.g., in the same fence, in the same room, or the like) within the stall.

The management control unit 250 may generate a feedback signal capable of ensuring the safety of a young object in consideration of the environment information when an abnormal symptom occurs in the young object according to the birthing of the pregnant object according to the determination result data. For example, the temperature inside the livestock stall 12 may be raised or the lighting of the livestock stall 12 may be brightened.

On the other hand, the management control unit 250 may transmit a warning message to the manager terminal 30 when an outsider visits the livestock stall 12 or a dangerous situation such as a fire occurs in the livestock 11 and the livestock stall 12.

According to an embodiment, the management control unit 250 may control the livestock stall control device 10 for a photographing direction of the camera unit 101, a sound level or turning-on/off of a warning sound, and an luminous intensity or turning-on/off of a lighting, turning-on/off of a door of the livestock stall 12, turning-on/off of fire facility, or the like, when an outsider visits the livestock stall 12 or a dangerous situation such as a fire occurs in the livestock 11 and the livestock stall 12.

In some embodiments, the management control unit 250 may generate livestock image data by using the image information and/or sensing information received from the livestock stall control device 10.

The manager terminal 30 may be a portable terminal possessed by the manager, which recognizes a situation of the livestock stall control device 10 in real time using an application program (or application) and control operation of the livestock stall control device 10 in response to the condition, and may download the application program from an external server or the livestock management server 20 through wireless communication. Here, although the manager terminal 30 is disclosed as being singular, it is not limited thereto and may be configured in plurality.

According to an embodiment, the manager terminal 30 may recognize the situation of the livestock stall control device 10 using the determination result data.

According to the embodiment, the manager terminal 30 may monitor data transmitted and received between the livestock stall control device 10 and the livestock management server 20 in real time through a screen, thereby quickly recognizing the situation of the livestock stall control device 10 and rapidly dealing with a current condition.

According to an embodiment, the manager terminal 30 may learn the standard livestock stall management data received from the livestock management server 20, compare and analyze the livestock image data, and generate determination result data.

According to an embodiment, when the manager terminal 30 receives the determination result data generated by the livestock management server 20, the manager terminal 30 may generate a feedback signal corresponding to the determination result data to transmit the generated feedback signal to the livestock management server 20 or the livestock stall control device 10. For example, the manager terminal 30 may determine an abnormal symptom of the livestock as a disease symptom, a birthing symptom, or a mounting symptom. Accordingly, the manager terminal 30 may generate a feedback signal corresponding to each abnormal symptom.

According to an embodiment, the manager terminal 30 may receive a feedback signal generated in response to the determination result data from the livestock management server 20.

According to an embodiment, the manager terminal 30 may generate livestock image data by using the image information and/or sensing information received from the livestock stall control device 10.

The operation of the smart livestock management system according to an embodiment of the inventive concept having the above-described structure will be described as follows. Although the smart livestock management method has been disclosed as being performed in the livestock management server 20, the inventive concept is not limited thereto.

Figure 3:
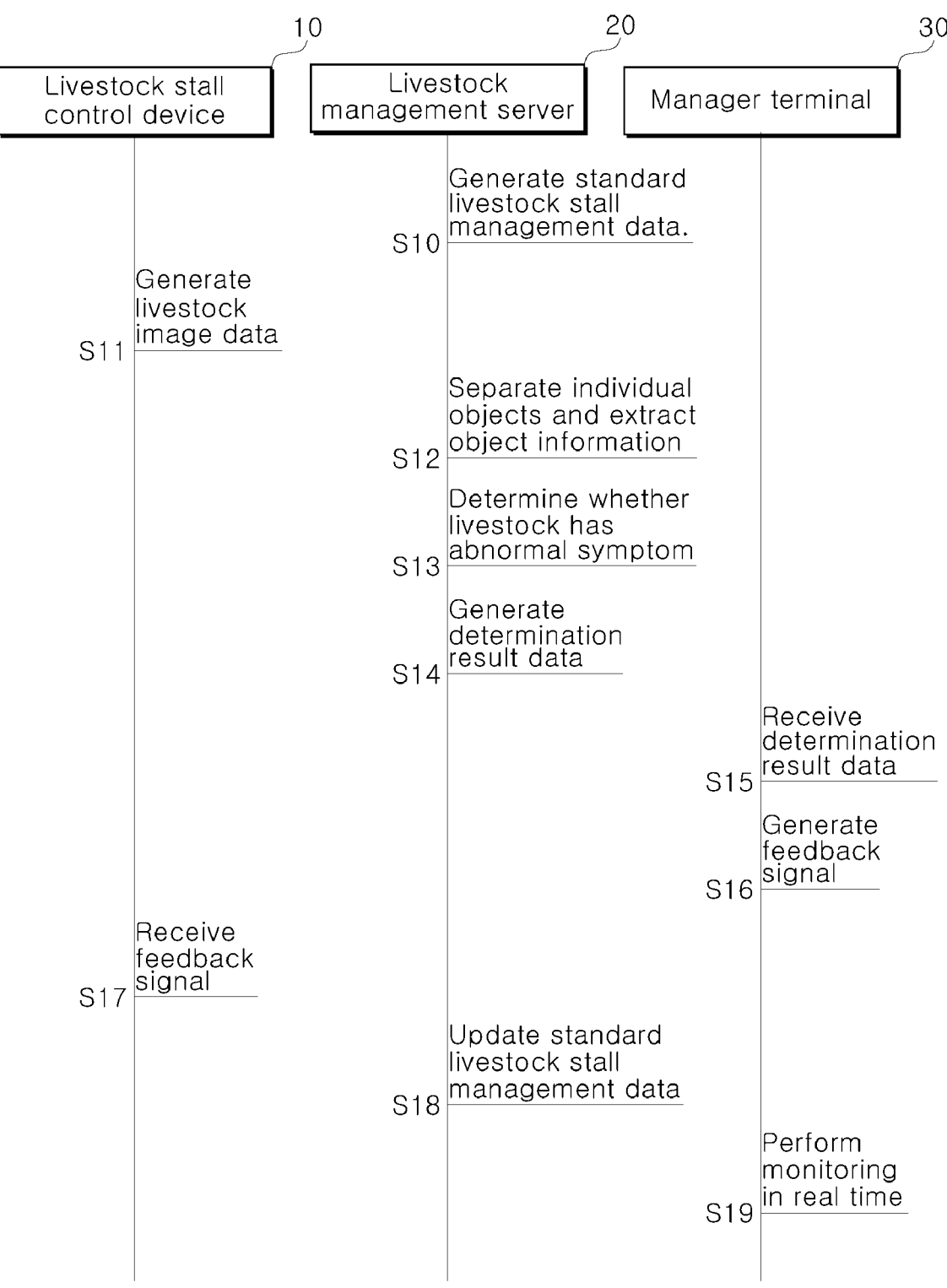
FIG. 3 is a diagram for describing a smart livestock management method according to an embodiment of the inventive concept.
Figure 4A:
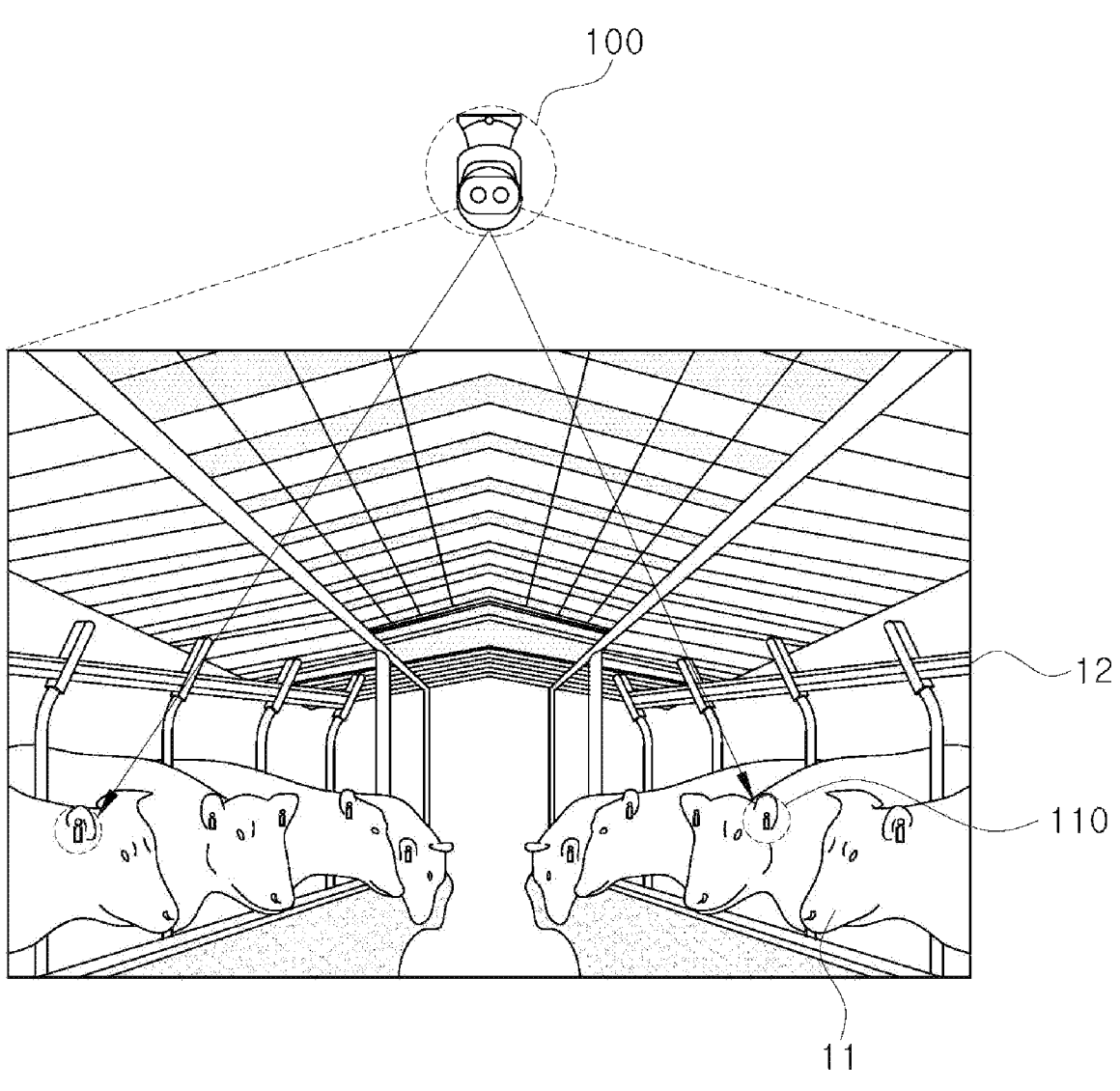
FIGS. 4A and 4B are diagrams for describing a method of generating livestock image data shown in FIG. 3.
Figure 4B:
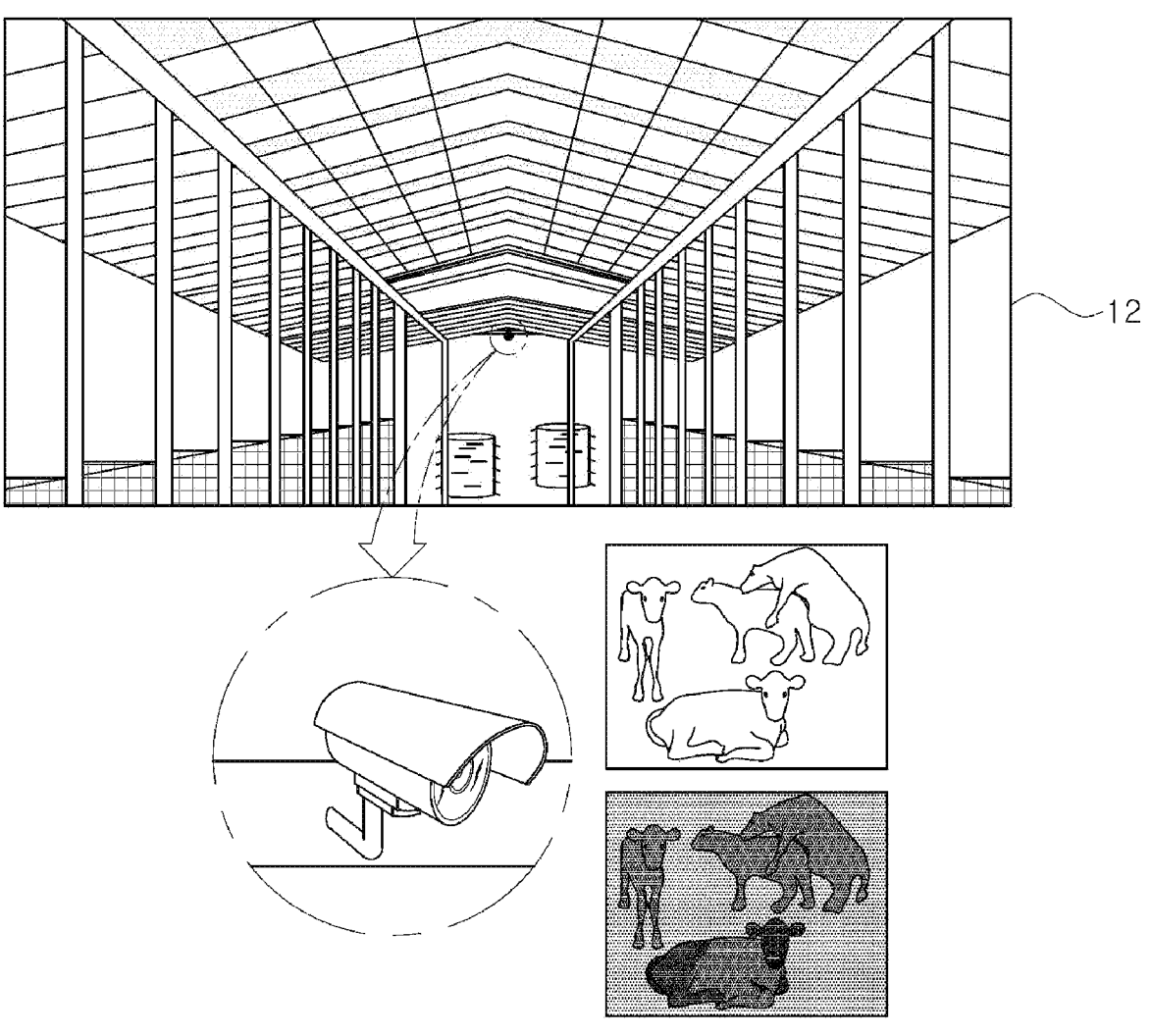
Figure 5A:
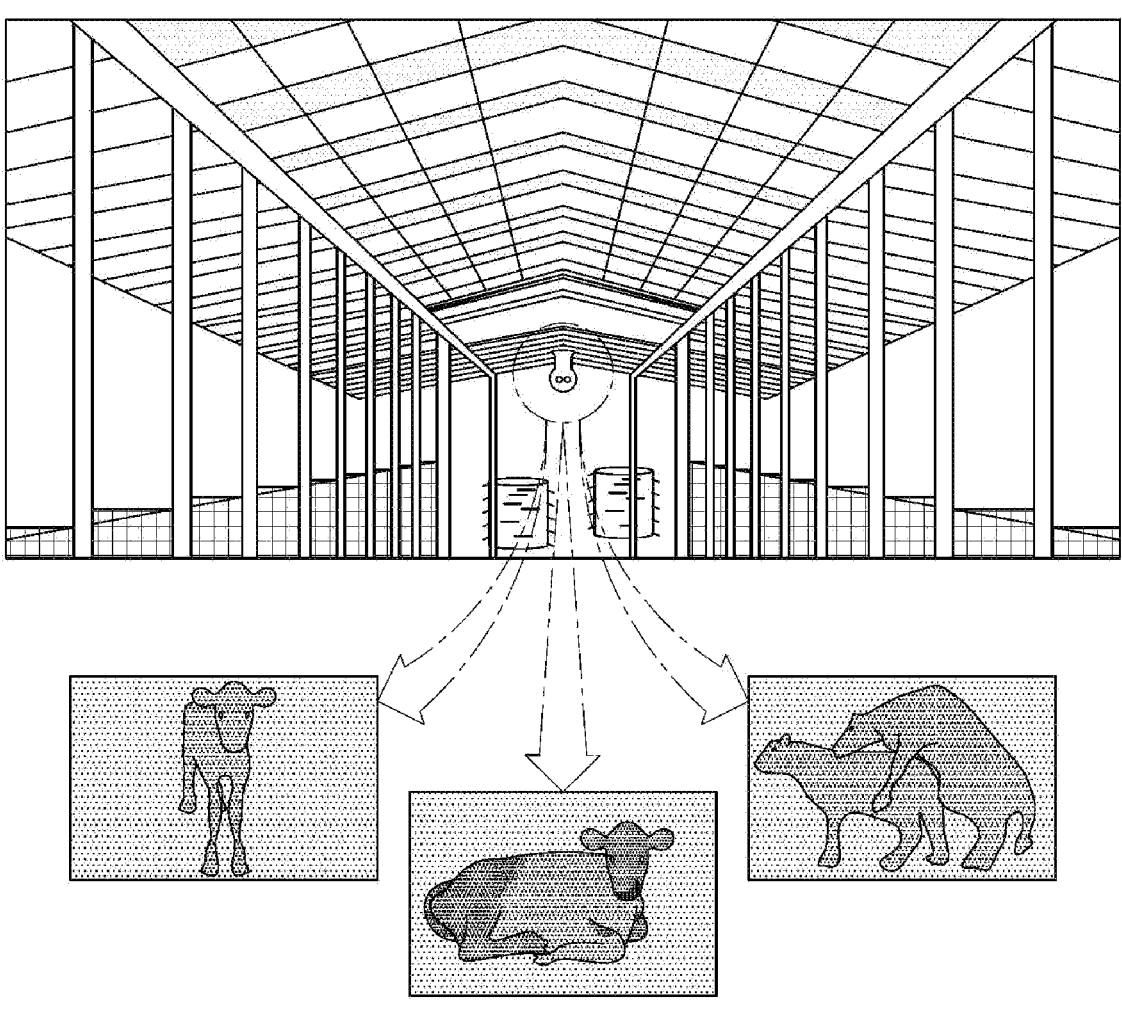
FIGS. 5A and 5B are diagrams for describing a method of separating objects and extracting object information shown in FIG. 3.
Figure 5B:
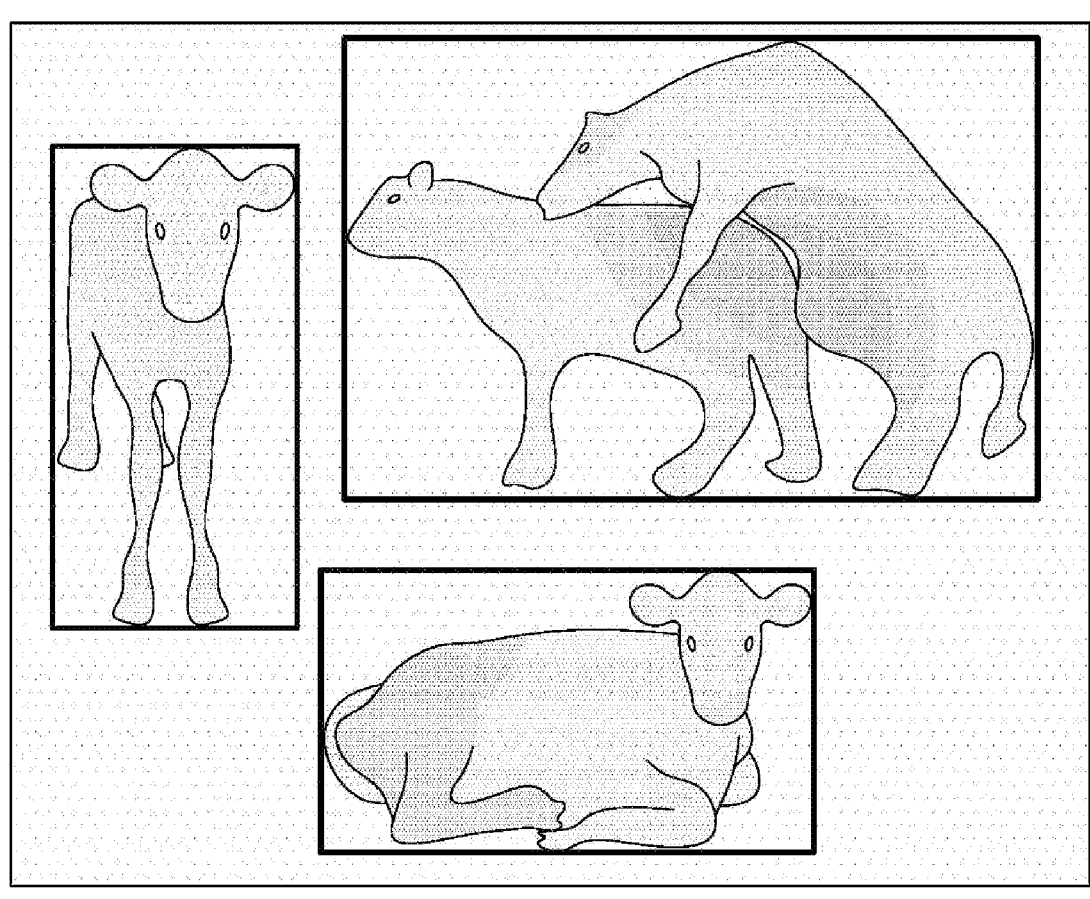
Figure 6:
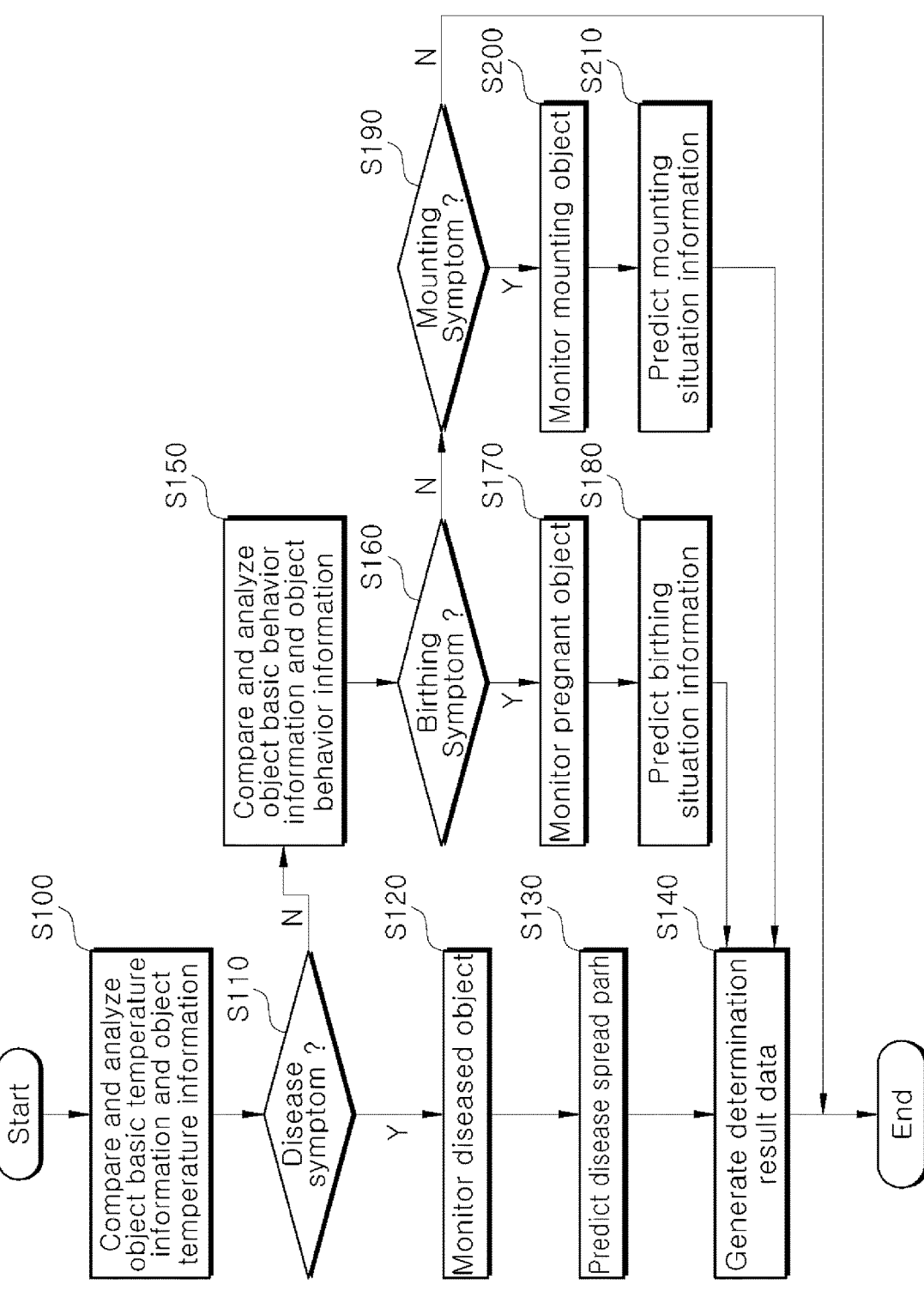
FIG. 6 is a detailed view for describing a step of generating determination result data shown in FIG. 3.
Figure 7A:
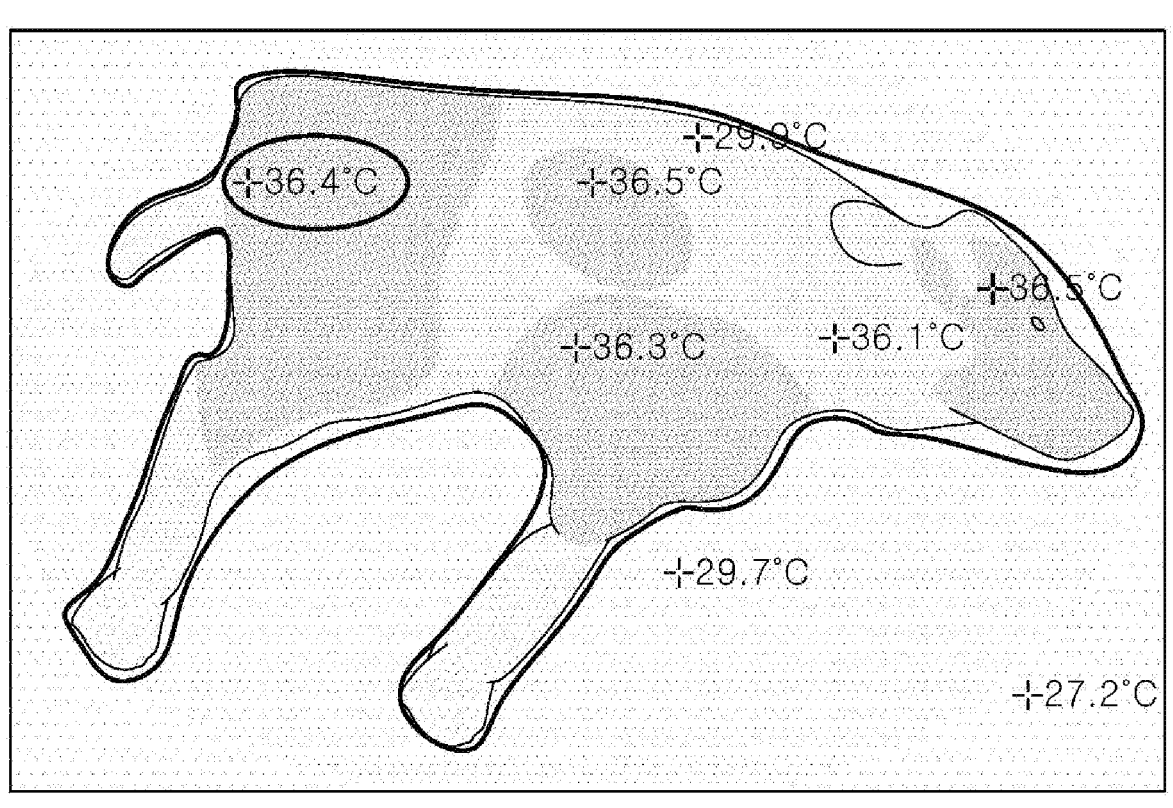
FIGS. 7A and 7B are diagrams for describing an embodiment for determining an abnormality of livestock shown in FIG. 6 as a disease symptom.
Figure 7B:
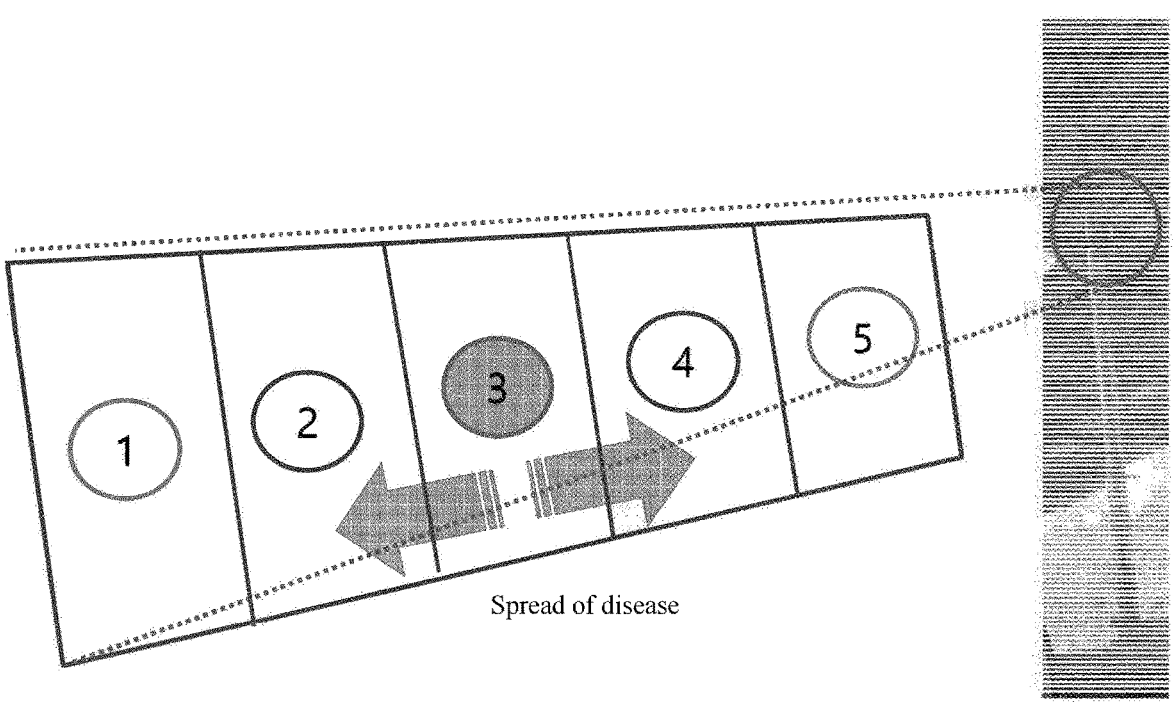
Figure 8:
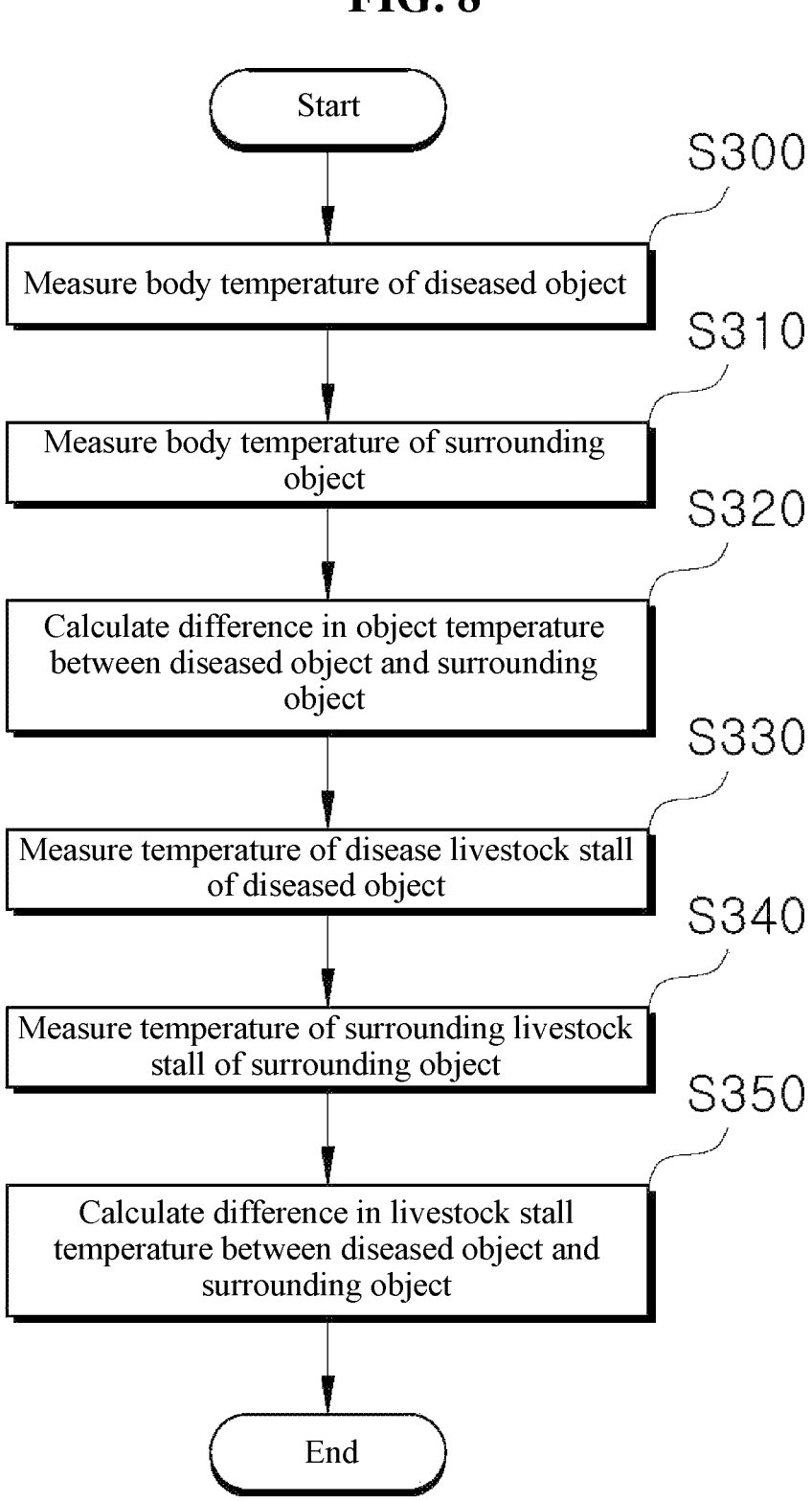
FIG. 8 is a detailed view for describing a step of predicting a disease spread path shown in FIG. 6.
Figure 9:
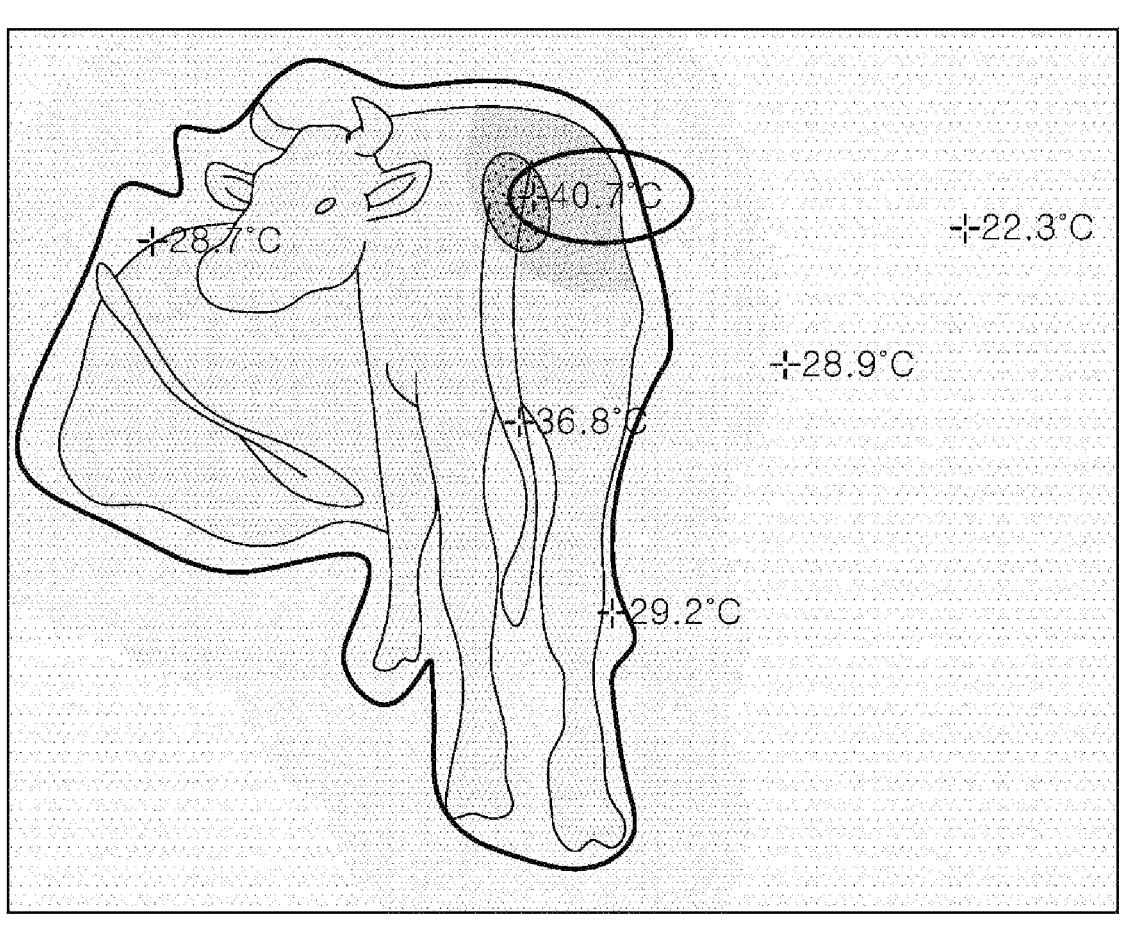
FIG. 9 is a view for describing an embodiment of determining an abnormality of livestock shown in FIG. 6 as a birthing symptom.
Figure 10:
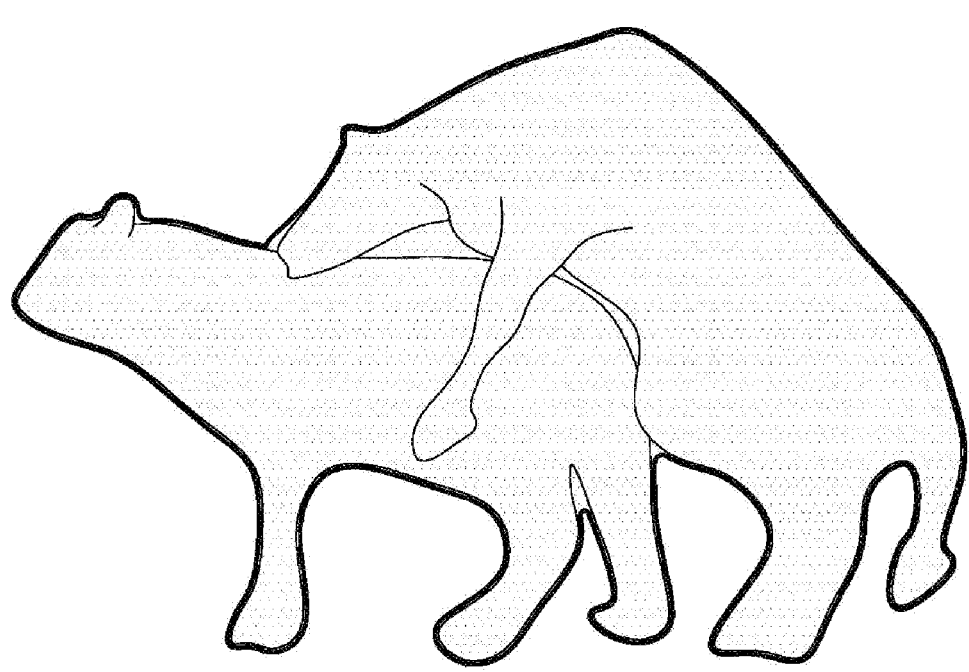
FIG. 10 is a view for describing an embodiment of determining an abnormality of livestock shown in FIG. 6 as a mounting symptom.

FIG. 3 is a diagram for describing a smart livestock management method according to an embodiment of the inventive concept, FIGS. 4A and 4B are diagrams for describing a method of generating livestock image data shown in FIG. 3, FIGS. 5A and 5B are diagrams for describing a method of separating objects and extracting object information shown in FIG. 3, FIG. 6 is a detailed view for describing a step of generating determination result data shown in FIG. 3, FIGS. 7A and 7B are diagrams for describing an embodiment for determining an abnormality of livestock shown in FIG. 6 as a disease symptom, FIG. 8 is a detailed view for describing a step of predicting a disease spread path shown in FIG. 6, FIG. 9 is a view for describing an embodiment of determining an abnormality of livestock shown in FIG. 6 as a birthing symptom, and FIG. 10 is a view for describing an embodiment of determining an abnormality of livestock shown in FIG. 6 as a mounting symptom.

First, as shown in FIG. 3, the livestock management server 20 may generate standard livestock stall management data (S10).

Specifically, the livestock management server 20 may generate the standard livestock stall management data by repeatedly learning object information extracted from livestock image data. Here, the standard livestock stall management data may include object basic temperature generated by repeatedly learning the highest body temperature information and lowest body temperature information of a normal livestock and a surrounding livestock of the normal livestock and livestock stall basic temperature information generated by repeating learning the highest temperature information and the lowest temperature information of a normal livestock stall and a surrounding livestock stall of the normal livestock stall, but is not limited thereto.

Next, the livestock stall control device 10 may generate the livestock image data by photographing the livestock 11 located in the livestock stall 12.

For example, as shown in FIGS. 4A and 4B, the livestock stall control device 10 may generate the livestock image data by performing conversion on image information obtained by photographing a plurality of livestock 11 having the identification tag 110 attached and surrounding environment of livestock stalls 12 in which the plurality of livestock 11 are located.

On the other hand, the livestock stall control device 10 may generate the livestock image data by converting the image information and the sensor information acquired from the sensor unit 120. In this case, the livestock image data may include current situation information including real-time weather information, season information, time information, or the like.

Next, the livestock management server 20 may separate a plurality of livestock 11 included in the livestock image data received from the livestock stall control device 10 into individual objects, and extract object information for each object (S12).

For example, as shown in FIGS. 5A and 5B, the livestock management server 20 may separate the plurality of livestock 11 into individual objects using the identification tag 110, but is not limited thereto.

Next, the livestock management server 20 may generate determination result data by determining whether an object has an abnormal symptom by using a result of analysis of the livestock image data based on the standard livestock stall management data (S13 and S14).

Specifically, referring to FIG. 6, the livestock management server 20 may perform comparison and analysis by matching object body temperature information of object information included in the livestock image data and object basic temperature information included in the standard livestock stall management data and matching object behavior information of the object information included in the livestock image data and object basic behavior information included in the standard livestock stall management data (S100) and determine an abnormal symptom as a disease symptom (S110). For example, when the object temperature is higher or lower than the object basic temperature information and the object behavior information indicates that there is no movement, the livestock management server 20 may determine an abnormal symptom as a disease symptom for a corresponding object.

Next, when the determination result indicates a disease symptom, the livestock management server 20 may monitor the object body temperature information of a diseased object as shown in FIGS. 7A and 7B (S120), and predict a disease spread path related to the diseased object and generate the determination result data (S130 and S140).

For example, as a result of monitoring, when the diseased object of FIG. 7A is located in ③ of FIG. 7B, it is possible to predict the disease spread path as to whether a disease spreads in the order of ③>②>① or ⑤>④>③ by using the object information of the diseased object, object information of a surrounding object of the diseased object, livestock stall information in which the diseased object is located, and livestock stall information in which the surrounding object of the diseased object is located.

More specifically, referring to FIG. 8, the livestock management server 20 may measure a body temperature of the diseased object to calculate first object temperature information (S300), and measure body temperature of the surrounding object of the diseased object to calculate second object temperature Information (S310).

Next, the livestock management server 20 may calculate a difference in object temperature between the calculated first object temperature information and the calculated second object temperature information to generate a first temperature difference (S320).

Next, the livestock management server 20 may calculate first livestock stall temperature information by measuring a temperature of a disease livestock stall where the diseased object is located (S330), and calculate second livestock stall temperature information by measuring a temperature of a surrounding livestock stall where the surrounding object is located (S340).

Next, the livestock management server 20 may generate a second temperature difference by calculating a difference between the calculated first livestock stall temperature information and the second livestock stall temperature information (S350).

Accordingly, the livestock management server 20 may predict a disease spread path in consideration of the calculated object temperature difference and the calculated livestock stall temperature difference.

On the other hand, when the abnormal symptom is not determined as a disease symptom as a result of performing comparison and analysis by matching the object body temperature information of the object information included in the livestock image data with the object basic temperature information included in the standard livestock stall management data with respect to the object (S100), the livestock management server 20 may compare and analyze the object body temperature information of object information included in the livestock image data and the object basic temperature information included in the standard livestock stall management data and compare and analyze the object behavior information of the object information included in the livestock image data and the object basic behavior information included in the standard livestock stall management data and as a result of the comparison and analysis, determine the abnormal symptom as a birthing symptom (S150 and S160). For example, when the object temperature is lower than the object basic temperature information, and the object behavior information indicates a behavior pattern representative of birthing learned by deep learning technique, the livestock management server 20 may determine the abnormal symptom of the object as the birthing symptom.

Next, when the determination result indicates the birthing symptom, the livestock management server 20 may monitor the object behavior information of a pregnant object as shown in FIG. 9 (S170), and predict birthing situation information of the pregnant object and generate the determination result data (S180).

In addition, the livestock management server 20 may determine a mounting symptom when the determination result indicates that the abnormal symptom is not the birthing symptom (S190). That is, the livestock management server 20 may determine the abnormal symptom as a mounting symptom as a result of comparing and analyzing the object body temperature information of the object information included in the livestock image data and the object basic temperature information included in the standard livestock stall management data and comparing and analyzing the object behavior information of the object information included in the livestock image data and the object basic behavior information included in the standard livestock stall management data.

For example, when the object temperature is higher than the object basic temperature information, and the object behavior information indicates a behavior pattern representative of mounting learned by deep learning technique, the livestock management server 20 may determine the abnormal symptom of the object as the mounting symptom.

Next, when the determination result indicates the mounting symptom, the livestock management server 20 may monitor mounting behavior information for a mounting object as shown in FIG. 10 (S200), and predict mounting situation information of the mounting object and generate the determination result data (S210).

Next, the livestock management server 20 may transmit the generated determination result data to the manager terminal 30 (S15).

Subsequently, the manager terminal 30 receiving the determination result data may generate a feedback signal corresponding to the determination result data (S16).

According to an embodiment, the manager terminal 30 may learn the standard livestock stall management data received from the livestock management server 20, compare and analyze the livestock image data, and generate determination result data.

According to an embodiment, the feedback signal may be generated by the livestock management server 20.

Next, the livestock stall control device 10 may receive the feedback signal and control the livestock stall control device 10 (S17).

Next, the livestock management server 20 may update the standard livestock stall management data in real time in response to the determination result data (S18).

Finally, the manager terminal 30 may monitor the livestock stall control device 10 and the livestock management server 20 in real time.

For example, when the abnormal symptom of the object is a disease symptom, the manager terminal 30 may receive a disease spread path updated in real time.

In addition, when the abnormal symptom of the object is a birthing symptom, the manager terminal 30 may receive birthing situation information updated in real time.

In addition, when the abnormal symptom of the object is a mounting symptom, the manager terminal 30 may receive mounting situation information updated in real time.

Figure 11:
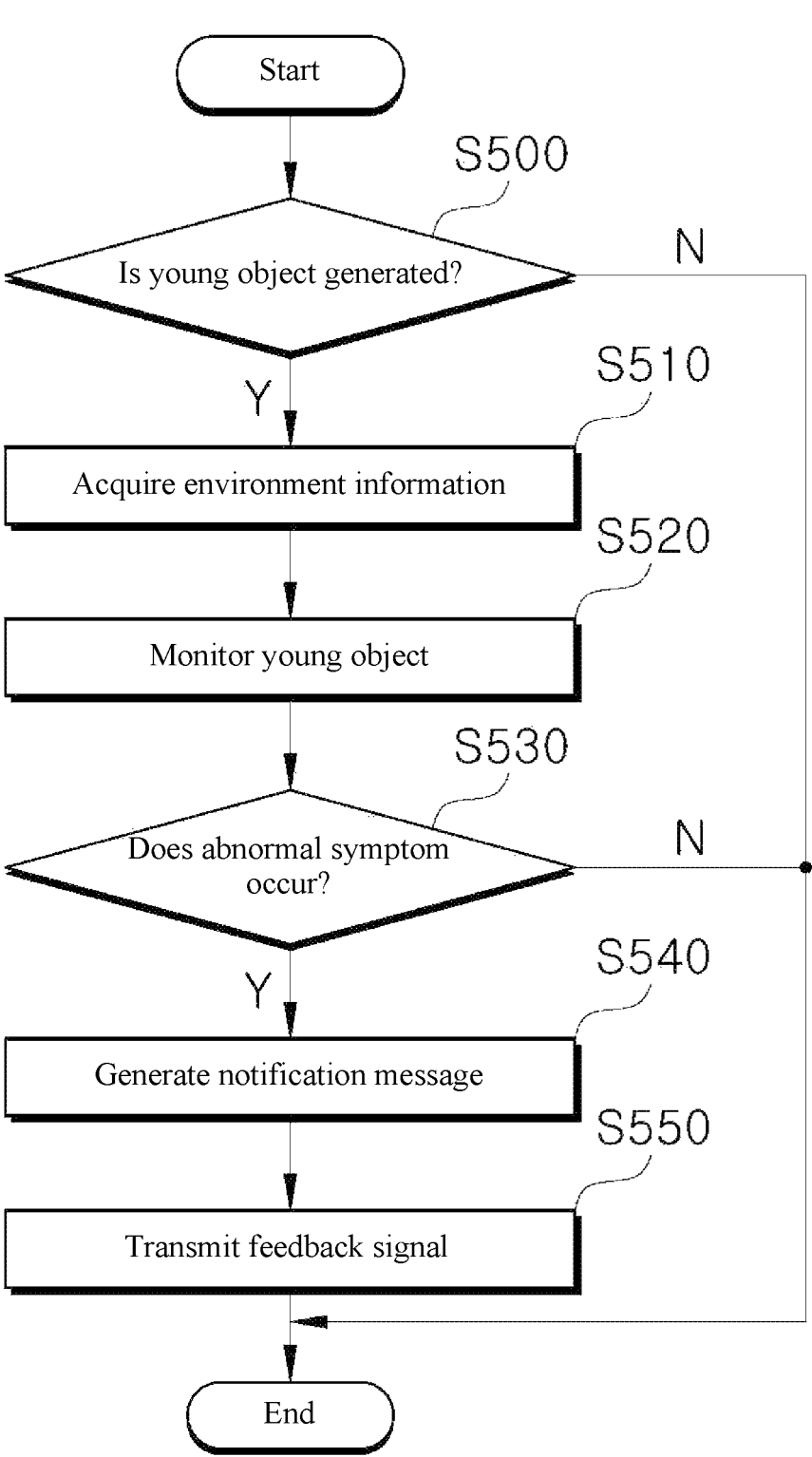
FIG. 11 is a view for describing a smart livestock management method according to another embodiment of the inventive concept.
Figure 12:
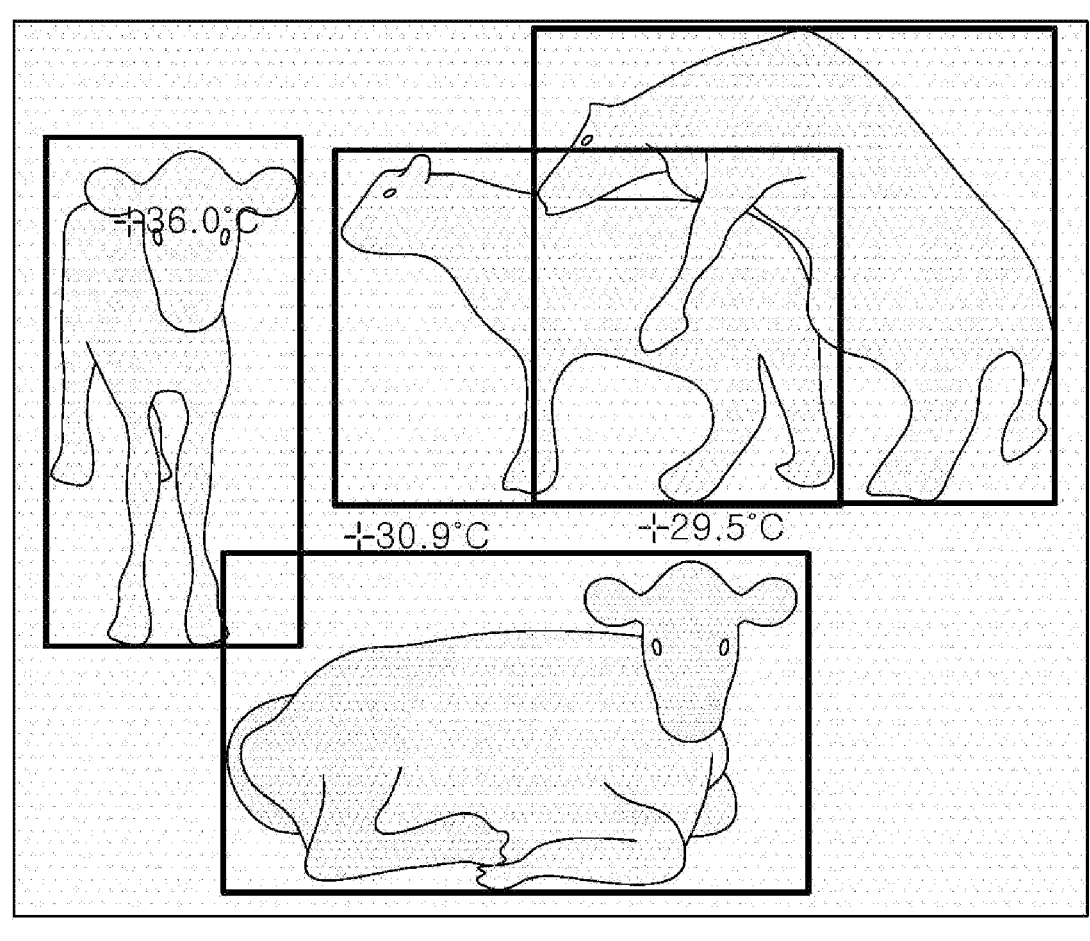
FIG. 12 is a diagram for describing a case in which a young object shown in FIG. 11 is generated.

FIG. 11 is a view for describing a smart livestock management method according to another embodiment of the inventive concept, and FIG. 12 is a diagram for describing a case in which a young object shown in FIG. 11 is generated.

Referring to FIG. 11, when a young object (young object) is generated due to the birthing of a pregnant object (mother object) (S500), the livestock management server 20 may monitor the young object in consideration of environment information (S510 and S520).

Next, when an abnormal symptom occurs in the young object (S530), the livestock management server 20 may transmit a notification message to the manager terminal 30 (S540).

Finally, the livestock management server 20 may receive a feedback signal for the notification message and transmit the feedback signal to the livestock stall control device 10 (S550).

The steps of a method or algorithm described in connection with the embodiments of the present disclosure may be implemented directly in hardware, in a software module executed by hardware, or in a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or in a computer readable recording medium that is well known in the art.

Although embodiments of the present disclosure have been described above with reference to the accompanying drawings, it is understood that those skilled in the art to which the present disclosure pertains may implement the present disclosure in other specific forms without changing the technical spirit or essential features thereof. Therefore, it should be understood that the embodiments described above are illustrative in all respects and not restrictive.

According to the inventive concept, it is possible to determine whether the animal has abnormal symptoms by learning the standard livestock stall management data and analyzing the body temperature information and behavior information of livestock from livestock image data obtained in real time from livestock such as cattle, thus giving the manager confidence.

According to the inventive concept, it is possible to easily manage livestock by quickly preventing the spread of disease by predicting the disease spread path of an abnormal object. Furthermore, the accuracy of diagnosis can be further improved by predicting the disease spread path of an abnormal object by considering both the object information of the livestock and the surrounding environment information.

According to the inventive concept, by analyzing the body temperature information and behavior information of the livestock from the livestock image data, and quickly determining whether the abnormal symptom of the livestock is a disease symptom, a birthing symptom and a mounting symptom, thus quickly dealing with the progress of each object and easily managing livestock.

According to the inventive concept, when an abnormal situation occurs regardless of time and place, the manager can check in real time whether the animal has abnormal symptoms, thereby providing reliability and convenience to the manager.

Effects of the inventive concept may not be limited to the above-described effects. Although not described herein, other effects of the inventive concept can be clearly understood by those skilled in the art from the following description.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An Artificial Intelligence (AI)-based livestock management system comprising:

a manager terminal for a livestock stall;

a livestock stall control device configured to:

detect at least one of a situation of the livestock stall and an abnormal symptom of a plurality of livestock in the livestock stall through a sensor unit; and acquire livestock image data obtained by photographing the plurality of livestock in the livestock stall through at least one of an imaging camera and a thermal imaging camera, in real time; and a management server configured to:

receive the livestock image data from the livestock stall control device in real time;

separate the plurality of livestock included in the livestock image data into individual objects;

extract object information from the livestock image data, the object information including object body temperature information and object behavior information for the individual objects;

generate determination result data obtained by determining at least one abnormal symptom of at least one livestock in the livestock stall by analyzing standard livestock stall management data and the object information based on deep learning technique; and transmit the generated determination result data to the manager terminal in real time, and control the livestock stall control device to change a livestock farming environment of the livestock stall based on the determined at least one abnormal symptom, wherein the standard livestock stall management data includes object basic temperature information generated by repeatedly learning highest body temperature information and lowest body temperature information of a normal object which do not have an abnormal symptom and a surrounding object of the normal object, livestock stall basic temperature information generated by repeatedly learning highest temperature information and lowest temperature information of a normal livestock stall and a surrounding livestock stall of the normal livestock stall, and object basic behavior information generated by analyzing normal behavior of the normal object, the standard livestock stall management data being updated based on the determination result data, wherein the livestock management server generates the determination result data by determining and classifying the abnormal symptom of the livestock into a disease symptom, a birthing symptom and a mounting symptom, wherein, when predicting the disease symptom, the livestock management server is further configured to:

compare and analyze the object body temperature information and the object basic temperature information, and the behavior information and the object basic behavior information;

determine that an object among the individual objects has a disease symptom as the abnormal symptom, when the object body temperature information is higher or lower than the object basic temperature information and the behavior information indicates that there is no movement;

obtain first object temperature information by measuring a body temperature of the diseased object;

obtain second object temperature information by measuring a body temperature of a surrounding object of the diseased object;

predict a disease spread path by calculating a first temperature difference between the first object temperature information and the second object temperature information based on the object basic temperature information;

generate a first feedback signal for requesting a separation of a diseased object and a normal object by based on the predicted disease spread path; and transmit the first feedback signal to the livestock stall control device, wherein the livestock stall control device is configured to open a door of the livestock stall in response to the first feedback signal, wherein, when predicting the disease spread path, the livestock management server is further configured to:

obtain first livestock stall temperature information by measuring a temperature of a disease livestock stall in which the diseased object is located;

obtain second livestock stall temperature information by measuring a temperature of a surrounding livestock stall of the disease livestock stall; and predict the disease spread path by calculating a second temperature difference between the first livestock stall temperature information and the second livestock stall temperature information based on the livestock stall basic temperature information, wherein, when predicting the birth symptom, the livestock management server is further configured to:

determine that an object has the birthing symptom as the abnormal symptom, when the object body temperature information is lower than the object basic temperature information or the behavior information indicates a behavior pattern is similar to a birthing pattern;

predict birthing situation information by monitoring the object behavior information of a birthing object;

transmit a notification message to the manager terminal, when a low body temperature of a new object delivered by the birthing object is detected and when an abnormal symptom of the new object occurs in consideration of environment information after birthing of the birthing object;

generate a second feedback signal for raising temperature of the livestock stall or brightening lighting of the livestock stall; and transmit the second feedback signal to the livestock stall control device, wherein, when predicting the mounting symptom, the livestock management server is further configured to:

determine that an object has a mounting symptom as the abnormal symptom, when the object body temperature information is higher than the object basic temperature information and when the behavior information indicates a behavior pattern representative of mounting learned by the deep learning technique;

predict mounting situation information by monitoring the object behavior information of a mounting object;

generate a third feedback signal for locating the object and a target object expected to be mounted by the object in the same space within the stall; and transmit the third feedback signal to the livestock stall control device, wherein the manager terminal is further configured to:

monitor the livestock stall control device and the management server in real time;

receive the disease spread path updated in real time, when the abnormal symptom of the object is the disease symptom;

receive the birthing situation information updated in real time, when the abnormal symptom of the object is the birthing symptom; and receive the mounting situation information updated in real time, and when the abnormal symptom of the object is the mounting symptom.

* * * * *